Figure 1:
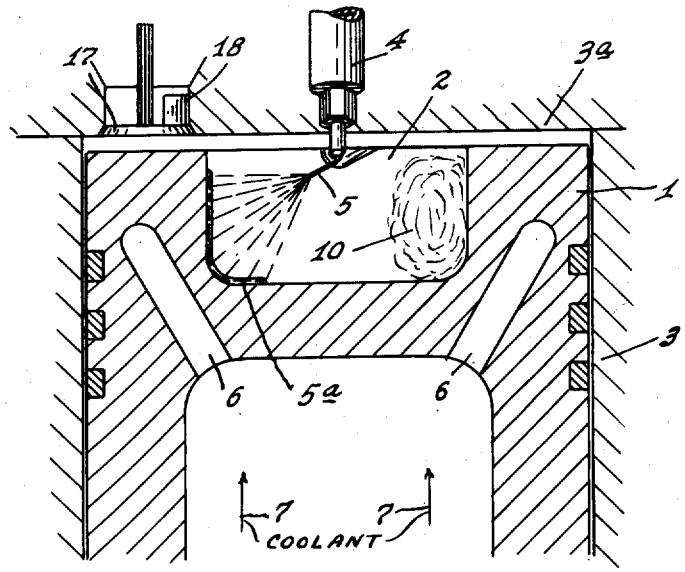

Jan. 19, 1960 S. MEURER 2,921,566
INTERNAL COMBUSTION ENGINE AND METHOD OF OPERATING IT
Filed June 7, 1956 3 Sheets-Sheet 1

INVENTOR.
SIEGFRIED MEURER,
BY
ATTORNEYS.

Jan. 19, 1960 S. MEURER 2,921,566
INTERNAL COMBUSTION ENGINE AND METHOD OF OPERATING IT
Filed June 7, 1956 3 Sheets-Sheet 2
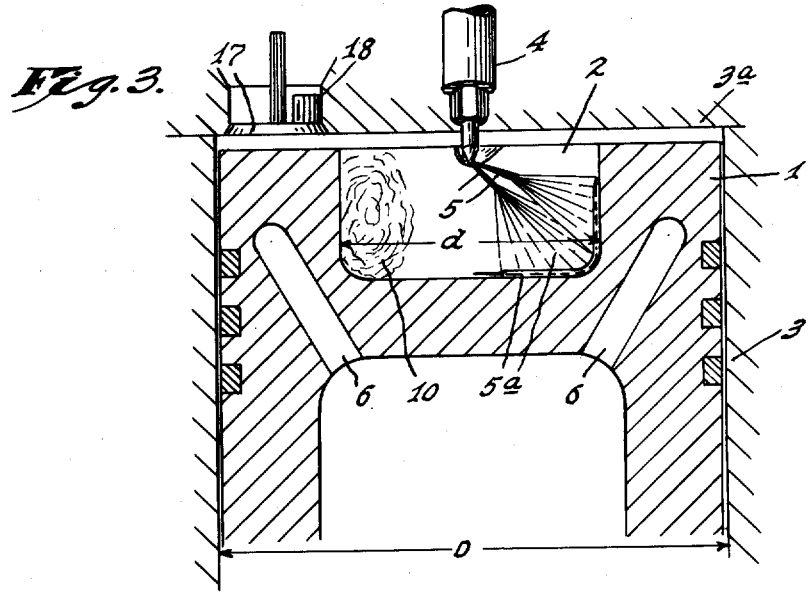
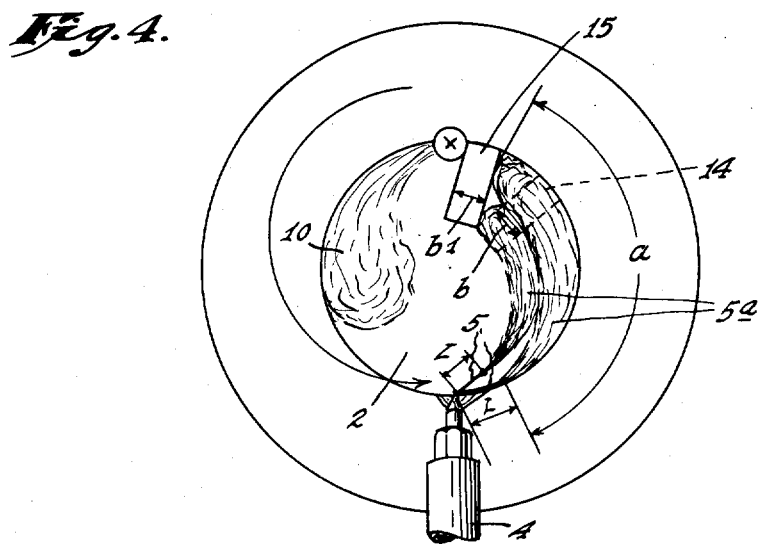
INVENTOR.
SIEGFRIED MEURER,
BY
ATTORNEYS.

Jan. 19, 1960   S. MEURER   2,921,566
INTERNAL COMBUSTION ENGINE AND METHOD OF OPERATING IT
Filed June 7, 1956   3 Sheets-Sheet 3

INVENTOR.
SIEGFRIED MEURER,
BY
ATTORNEYS.

# United States Patent Office 2,921,566
Patented Jan. 19, 1960

2,921,566
INTERNAL COMBUSTION ENGINE AND METHOD OF OPERATING IT

Siegfried Meurer, Nurnberg, Germany, assignor to Maschinenfabrik Augsburg-Nurnberg A.G., Augsburg, Germany Application June 7, 1956, Serial No. 590,033

Claims priority, application Germany June 10, 1955

15 Claims. (Cl. 123—32)

This invention relates to internal combustion engines, and more particularly to an engine of the type equipped with independent mixture-igniting means, such as a spark plug, in contrast to compression-ignition engines, and to a method of operating such engines.

It is an object of the invention to improve the combustion process in regard to the formation of the mixture and the molecular condition of the mixture of fuel and air to be burnt.

As is well known, the limit for an increase of the output of an internal combustion engine of the type referred to is defined by the occurrence of knocking, which, of course, is caused by a self-ignition of the residue of the combustible mixture which is burning in the last phase of each combustion period. The compression ratio of such an internal combustion engine and so the thermal efficiency thereof is limited by the fact that the anti-knocking property of the fuel cannot be increased beyond a certain limit.

It is a special object of the invention therefore, to provide a method of operation by which this limit can be overcome. It has been found that the knocking can occur only because a mixture ready for combustion is available in the combustion chamber, and exposed to a compression by the flame front.

In view of the complicated nature of the combustion process and the various phenomenons occurring during this process, it may be permitted to give some more detailed explanations as to the observations and contemplations on which the present invention is based:

If it is possible to carry out a mixing process in which the two components of the mixture, i.e. fuel and air, are not mixed completely beforehand, but are mixed only in individual portions right before the combustion process, self-ignition phenomenons will be safely prevented, since the compression effect of the flame front or of the expanding combustion gases does not influence any longer a mixture ready for combustion, but only the unmixed separate portions of air and fuel. To this end it is necessary, in a mixing process proceeding very quickly, to expose in each working cycle at repeated instances always only a small quantity of fuel and air to the mixing process, which small quantities must be formed each time only immediately before their combustion. Only under this condition the period of time during which these small amounts of fuel-air mixture, even in case of a high compression ratio, are exposed to the temperature, is so short that combustion is effected before self ignition can occur.

It will thus be understood that it is a main object of the present invention to control the combustion in such a way that the process of mixing and burning is split up into a large number of individual combustion processes which partly pass over into each other, contrary to the conventional combustion process in combustion engines of the type referred to, in which a flame front passes through the mixture which is ready for combustion in its entirety. Even if in the individual combustion process owing to a very high compression the combustion does not take place without the self-ignition of a certain share of the mixture of each individual portion, yet the consequence of this self-ignition is entirely different from that of the self-ignition in the conventional process, since it cannot be propagated to a large portion of the mixture, but only to a portion which has just been mixed and is about to be burnt. In this manner it is possible to split up also the knocking process into individual processes and to convert its drawbacks into advantages since the accelerating effect occurs repeatedly but in small doses, and thus acts to accelerate the entire process.

Basing on these considerations and knowledges about the effects and phenomenons occurring during the combustion process, the method of mixing and burning the fuel according to the present invention is as follows:

(1) The fuel is introduced into the cylinder in such a way that it forms a thin film on the wall of the combustion chamber. To this end one or more solid fuel jets are injected tangentially into the combustion chamber from a point closely adjacent to a peripheral wall thereof and substantially concurrently to the direction of air rotation, in such a way that the fuel jet or jets impinge onto said wall at an acute angle of minimum size, and with a length which is so short that scattering of the solid jet or jets before its impinging on the wall is prevented, with the result that the fuel will be spread as a film over a substantial, circumferentially extending portion of the wall. Hereat, the wall of the combustion chamber is kept at so low a temperature that vaporization of said film of fuel by action of the heat of said wall alone would not occur in due time for the working cycle for which the fuel has been injected. The vaporization of the fuel from the wall is rather caused not sooner than with the setting in of the combustion and by the additional heating effect resulting by the increased radiation of heat onto the wall surface on which the fuel has been deposited.

(2) For releasing the fuel film deposited on the wall of the combustion chamber, in the form of vapor, a rotating air current is produced in the working cylinder and in the combustion chamber which air current is passed in the combustion chamber over the wall area wetted with fuel in a regulated path of flow and mixed exclusively with evaporated fuel.

(3) The fuel vapor-air mixture formed by the air current is ignited, at the proper time in the engine cycle, by means of an independent ignition device, such, for example, as a spark plug.

The preferred form of engine embodies a circular combustion chamber which is of smaller diameter than the cylinder and the axis of which is coincident with or parallel to the cylinder axis, and means are provided for imparting swirling movement about the cylinder-axis to the air charge entering the cylinder. As the charge is compressed during the compression stroke, it is forced into the combustion chamber with an accompanying increase in rotational velocity, with the result that a vigorous rotational movement of the air exists in the combustion chamber. As the piston approaches top dead-center, liquid fuel is injected in the manner explained above in greater detail. The ignition device is desirably located somewhat beyond the end of the liquid film in the direction of air-rotation within the combustion chamber, so that the mixture formed as the air sweeps the surface of the liquid film will be carried promptly in the vicinity of the ignition device.

It will be understood that contrary to a normal gasoline engine (Otto method) substantially no fuel is admixed to the air flowing into the cylinder, such as is the case in a normal gasoline engine. Thus, inadvertent self-ignition of larger quantities of fuel can be prevented.

At the utmost it may be advisable, however, to admix to said air a small amount of fuel, for improving the mixing process, which amount, however, is at a mixing ratio with respect to the air which is safely below the ignition limit. The wall of the combustion chamber should be shaped in such a way that the fuel impinging on it is able to spread on a maximum area thereof in the form of a film and that on the other hand a maximum share of the flowing air is able to sweep over said area. According to a further feature of the invention a combustion chamber in the form of a cavity of rotation and more particularly a cavity generated by rotation of a curve is particularly suitable. The flow of the air must be strictly regulated and for producing such an air flow all the methods may be used which are applied for instance in Otto engines or diesel engines in connection with the various shapes of combustion chambers.

Various kinds of air flows can be distinguished as follows:

(a) A type of flow caused by compression of the air, during the compression stroke, into a constricted combustion chamber, such kind of flow being known as a flow effected by squeezing, without subdivision of the combustion chamber, (b) A flow caused by a squeezing effect or by rotating air flow caused by a subdivision of the combustion chamber, throttling channels being existing between the compartments of the combustion chamber for accelerating and directing the air flow, (c) A rotating air flow caused during the suction stroke or during the scavenging process and having an axis of rotation which is nearly parallel to the axis of the cylinder.

Even in case of the latter types of air flow, combustion chambers with a constricted inlet opening may be advantageously used, which are arranged substantially coaxial to the rotation of the air, having a substantially reduced diameter compared to the cylinder diameter.

All of these kinds of air flow can be used in the method according to the invention. In general, the last mentioned kind of air flow will be preferred since this type of air flow permits high velocities of air which simultaneously are maintained for a sufficiently long time to release the fuel film completely in the above explained series of successive individual mixing steps. This is because the air flow is not stopped by the combustion process nor by any expansion actions of the combustion gases. This last mentioned advantage is inherent to all those kinds of air flow whose axis of rotation is parallel to the cylinder axis. It will be appreciated that the method of operation as hereinbefore described, owing to the formation of the mixture by applying the fuel on the wall of the combustion chamber and releasing the vaporizing fuel from said wall by a suitable air flow, the knocking tendency in applied ignition-internal combustion engines is reduced to a minimum because the mixture of fuel vapor and condensation air is formed always only immediately before the moment where the combustion actually begins. The mixture of vaporizing fuel and combustion air thus is exposed to the influence of high pressure and temperature for a very short length of time only, contrary to the Otto engine, for example, in which the components are introduced and compressed together and hence the mixture is ready for a protracted period before its combustion, with the result that the compression ratio and hence the output and the efficiency of the engine is limited by the octane number. This limitation is removed by the method of operation according to the present invention. In fact, it is necessary that in view of the lower compression ratio necessitated for external ignition, a reliable ignition of the fuel spread on the wall and mixed with the air in vaporized form is ensured. The conventional spark plug is normally adapted for effecting the ignition in the method of operation according to the invention. However, it must not be ignored that, for instance in case of a spark plug, there is always formed only a locally or spatially limited ignition spark. This may cause difficulties where the mixture is formed according to the invention by spreading the fuel on the wall of the combustion chamber since it cannot be determined with 100 percent safety that the mixture which is just suitable for the ignition in present at the point where the ignition spark is formed.

In order to remove these difficulties according to a further feature of the invention it is contemplated to provide a zone of increased reaction velocity in the range of, or adjacent to the area of the wall of the combustion chamber wetted with the fuel film, additionally to or independently of, the ignition device. To this end a locally defined zone of the wall surface wetted with fuel may be lined, coated or provided with one of the per se known catalytic substances such as sodium, platinum sponge or the like over which the fuel vapor-air mixture is passed each time directly after its production, in the direction of the air circulation.

By thus lining certain zones of the wall of the combustion chamber with a catalyst, the reaction speed of the fuel vapor-air mixture is greatly increased at the respective spots, whereby the ignition is safely initiated.

According to a further feature of the invention the zone of the combustion chamber coated or otherwise provided with a catalytic material is arranged at the end of, or beyond, the wetted area of the combustion chamber, in the direction of the rotating air. Preferably the catalyst is applied in a band extending transversely of the direction of air movement over the wall of the combustion chamber, so as to occupy a portion of such wall of lesser circumferential extent than the portion occupied by the liquid fuel film.

In this manner the thermally produced ignition can be aided by a local decomposition ignition or the catalytic coating may even replace the ignition device rather than merely supplementing it.

It will be appreciated that the method of operation according to the invention is different from methods of mixing and burning fuel in internal combustion engines of the self-igniting type in as much as the self-ignition requires fuels having a certain tendency of decomposition, i.e. a relatively low octane number. On the other hand, where only fuels with a high octane number are available, the methods operating with self-ignition cannot be used any more and in this case the advantage of my novel method of operation is particularly significant. The same is true where fuels of an inferior nature, i.e. with a high tendency of self-ignition or knocking tendency are to be burnt in an engine whose compression ratio ought to be low for constructional reasons, but is intended to be increased as much as possible in order to reduce the fuel consumption. In this case, compression ratios come into question which are between those of the Otto engine and those of the diesel engine, i.e. between 1:8 and 1:14. Such compression ratios are too low for self-ignition, but also they are too high for the formation of a mixture in the manner as hitherto performed by the Otto engine compressing a fuel air mixture. The method according to the invention can be used in this range with particular success.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2:
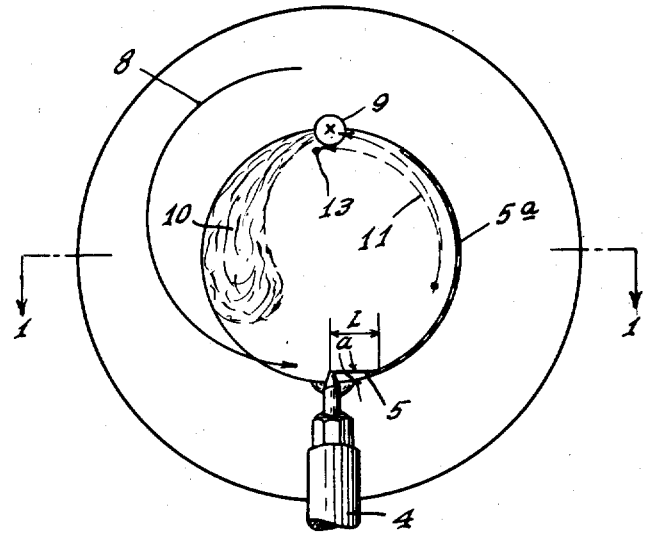
Figure 5:
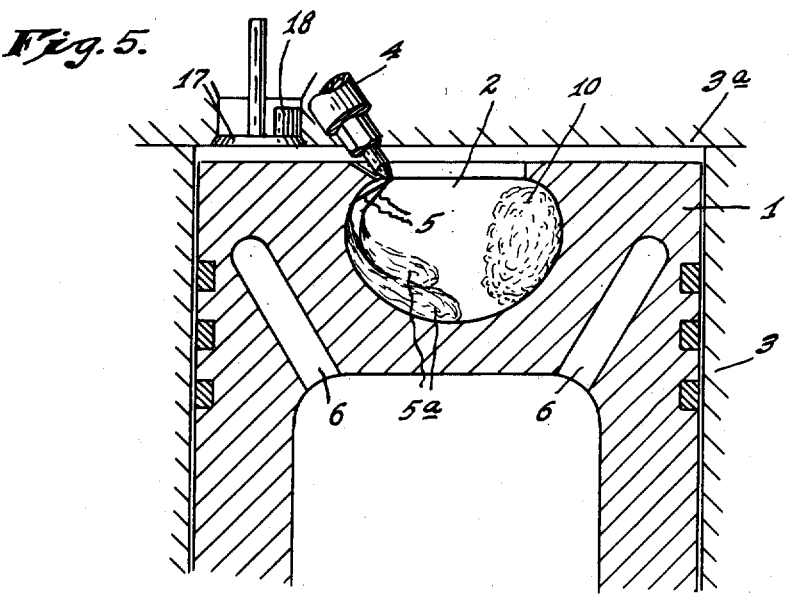
Figure 6:
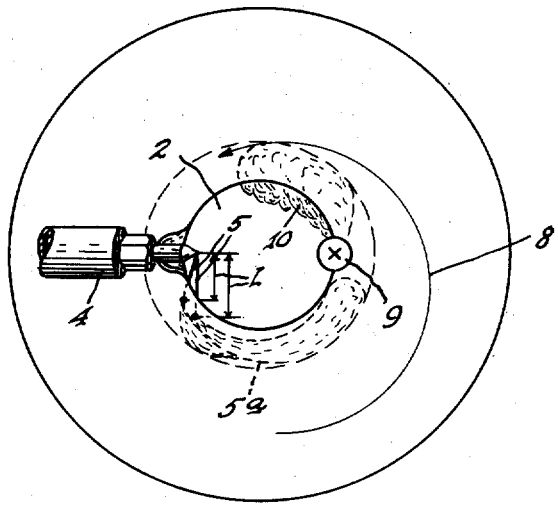

Fig. 1 is an axial section on line I—I of Fig. 2, somewhat diagrammatic in character, through the head end of the cylinder of an interior combustion engine of the independent ignition type, Fig. 2 is a plan view of the piston and the fuel-injecting nozzle, Fig. 3 is a view similar to Fig. 1 illustrating another embodiment of the invention, Fig. 4 is a plan view of the piston shown in Fig. 3,
Fig. 5 is an axial section of a further modification, and
Fig. 6 is a plan view of the piston thereof.

Similar reference numerals denote similar parts in the different views.

The engine shown in Fig. 1 includes a piston 1 having in its head a coaxial combustion chamber 2 opening into the interior of the engine cylinder 3. Mounted in the head 3a of the engine cylinder 3 is a fuel-injector 4 of the solid-injection type so positioned that it discharges fuel from a point close to the periphery of the combustion chamber 2 and in a direction closely tangential to the wall thereof, Fig. 2, so that the injected fuel jet 5 will form a film 5a on the wall of the combustion chamber. To provide for maintaining the wall of the combustion chamber 2 at the desired temperature, the piston is shown as provided with downwardly opening recesses 6 which extend upwardly in the piston head close to the wall of the combustion chamber and whose lower open ends are positioned to receive jets of an appropriate cooling fluid discharged in the direction indicated by the arrows 7.

The engine includes conventional means (not shown) for imparting to the admitted air charge a swirling motion, indicated by the arrow 8, Fig. 2, having a rotational direction corresponding in general to that in which the liquid fuel is injected into the combustion chamber. As the piston 1 moves upward in the compression stroke, the rotating air charge 8 is compressed into the combustion chamber 2, thereby increasing its rotational velocity which attains its maximum with respect to the fuel film 5a at the periphery of the combustion chamber wall. Since the air is rotating in a direction the same as that in which the fuel is injected, the rotating air mass aids in forming the injected fuel into the film 5a and, once such film is formed, sweeps the surface thereof to mix with fuel vapor.

Near or beyond that end of the film 5a remote from the injector 4, there is provided an ignition device, indicated diagrammatically at 9, which might be a conventional spark plug or any other device suitable for igniting the mixture.

The formation of the mixture and the combustion proceed as follows:

The fuel is applied on the wall of the combustion chamber 2, through a nozzle 4, in the form of at least one solid jet 5 of a very short free length L impinging upon the wall of the combustion chamber at a very small angle $\alpha$, in such a way that a fuel film 5a is formed on said wall, which film extends over a substantial part of the periphery of the combustion chamber. The point of time where the injection is effected may be near the end of the compression stroke but before the beginning of the power stroke. Such a temporal interval is admissible since it is possible to ensure, by the temperature of the wall of the combustion chamber, and possibly also by its shape and type, that the fuel adheres to the wall of the combustion chamber and at first forms only a very small quantity of vapor per unit of time. When at the end of the compression the temperature in the combustion chamber rises, a certain limited amount of vapor has been formed in connection with the slow vaporization on the wall of the combustion chamber, which vapor is entrained by the air current 8 towards the ignition device 9, for ignition. The air movement supplies further fuel, but exclusively in vapor form, to the combustion zone building up beyond the ignition device 9, whereby further fuel vapor-air mixture is fed to the flame. The rapid increase of temperature in the combustion chamber now beginning and the intensive radiation of the flame will considerably accelerate the vaporization of the fuel film 5a so that increasing amounts of vapor are seized by the circulating air in the unit of time, mixed with the air and fed to the combustion zone 10. The amount of mixture fed to the combustion zone 10 is controlled as to its quantity by the rate of vaporizing of the fuel film 5a. The path traversed by the fuel vapor particle 12 during the mixing process is indicated by the dotted line 11. It will be understood that fuel and air are commonly exposed to the action of the high temperature in the combustion chamber only during the period required for the fuel particle 12 to traverse the path from point 12 to the beginning of combustion at 13, which period is too short for permitting self-ignition processes, even in case of a high compression ratio. This also shows the importance of a high speed of the air; for, only by a correspondingly high velocity of the air the time required for a fuel particle to traverse the path of mixture 11 can be made so short that self-ignition is prevented even in case of a high compression ratio.

Also the illustration of Fig. 2 shows the significance of the method of spreading the fuel on the wall of the combustion chamber in the form of a thin film with respect to the combustion process; for, only in this way it is possible to avoid knocking phenomenons even with very high compression ratios, since fuel and air are brought together only immediately before the combustion begins.

In its principal features, the engine shown in Figs. 3 and 4 is substantially the same as that illustrated in Figs. 1 and 2 except that the injector 4 is shown as discharging two jets of fuel 5 which combine to form the film 5a. Another difference between the engine of Figs. 3 and 4 and that of Figs. 1 and 2 lies in the provision, on the wall of the combustion chamber 2, of coatings 14 and 15 of catalytic material, such as sodium or platinum sponge, capable of promoting combustion of the fuel-air mixture. The coatings 14 and 15 are confined to bands each of which has substantially less circumferential extent $b$ or $b1$ than that of the film 5 indicated by the arc "$a$" and is located near or just beyond that end of the film remote from the injector 4 so that the mixture formed at the surface of the film by the rotating air mass will be carried over the coating 14 and 15 at least by the time it reaches the ignition device 9. The catalytic coatings 14 and 15 may be used with poorly igniting fuels or under other conditions where, in the absence of the coating, the mixture existing at the ignition device 9 at the time of ignition would not be combustible.

It will be seen from Fig. 3 that the diameter "$d$" of the combustion chamber is substantially smaller than the diameter "$D$" of the cylinder. I prefer to provide a ratio $d/D$ not exceeding 0.75.

Figs. 5 and 6 show a modification in which the combustion chamber is spherically shaped. This shape offers special advantages in practice and, therefore, is a preferred form. The construction for the rest is the same as in the preceding figures and similar reference numerals have been used, so that it will not be necessary to describe these figures in greater detail.

It will be noted that in Figs. 1, 3, and 5, an air admission valve 17 is shown which is formed with a guide blade 18 for imparting a rotational flow to the air current entering into the cylinder. But this means is also but for example.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A method of burning fuel in an internal combustion engine having a combustion chamber and an ignition device operable at a predetermined point in the engine cycle to ignite an explosive mixture in said chamber, the steps of introducing liquid fuel into said chamber and immediately forming it into a film on the wall of the chamber, said fuel introduction being effected near the upper dead-center position of the engine-piston and at a predetermined interval prior to operation of said ignition device, maintaining the wall of the combustion chamber at a temperature insufficient in itself to result in the formation of an explosive mixture of air and fuel vapor in the interval between fuel-introduction and operation of the ignition device, and creating in said combustion chamber prior to the fuel introduction an air movement capable of speeding fuel-vaporization from said film to form an explosive mixture in said chamber by the time the ignition device operates.

2. A method as set forth in claim 1, with the addition that the fuel is applied on the wall by a solid fuel jet which is directed substantially tangentially of said wall and in the general direction of the rotation of the combustion air.

3. In an internal combustion engine having a cylinder, a piston, and a combustion chamber having a generally circular circumferential wall, means for introducing combustion air into the chamber and imparting rotatory movement to said air, means operable near termination of the air introduction for injecting liquid fuel into the chamber substantially tangentially of said wall and unidirectionally with the air and for forming such fuel into a film on said circumferential wall, and an ignition device spaced along said circumferential wall from the injecting means in the direction of air rotation, said ignition device being operable at a predetermined point in the engine cycle.

4. An engine as set forth in claim 3, with the addition that said combustion chamber is formed in the piston head, as a cavity of rotation.

5. An engine as set forth in claim 3, with the addition that said combustion chamber is provided in the piston head and has the shape of a cavity generated by rotation of a continuous curve.

6. An engine as set forth in claim 3, with the addition that said combustion chamber is provided in the piston head and has the shape of a cavity generated by rotation of a substantially circular curve.

7. An engine as set forth in claim 3, with the addition that said combustion chamber is substantially coaxial with the cylinder.

8. An engine as set forth in claim 3, with the addition that said combustion chamber is coaxial with the cylinder axis and has a diameter no more than seventy-five percent of the cylinder diameter.

9. An engine as set forth in claim 3, with the addition that said combustion chamber is coaxial with the cylinder axis and constricted towards its opening.

10. In an internal combustion engine having a cylinder, a piston, and a combustion chamber having an annular wall, means for introducing combustion air into the combustion chamber and imparting rotatory movement to said air, and means for injecting liquid fuel into the chamber substantially concurrently and unidirectionally with the air and for forming such fuel into a film on said annular wall, the wall of said combustion chamber in the vicinity of the wetted zone thereof being provided with a coating of catalytic material adapted to increase the reaction velocity of the fuel.

11. An engine as set forth in claim 3 with the addition of means for cooling that part of the wall on which the film is formed.

12. In an internal combustion engine having a cylinder, a piston, and a combustion chamber having a generally circular circumferential wall, means for introducing combustion air into the chamber and imparting rotatory movement to said air, means operable near termination of the air introduction for injecting liquid fuel into the chamber substantially tangentially unto the wall for forming such fuel into a film on said circumferential wall, and an ignition device spaced along said circumferential wall from the injecting means in the direction of air rotation, a portion of the wall of the combustion chamber in the region of the wetted surface of the combustion chamber wall consisting of a catalytic material adapted to increase the reaction velocity of the fuel.

13. An engine as set forth in claim 12 with the addition that the catalytic material is provided at a point between the site of fuel injection and the ignition device in the direction of air rotation.

14. An engine as set forth in claim 13 with the addition, that the catalytic material is provided between that area, which is normally wetted by the fuel film, and the ignition device.

15. An engine as set forth in claim 12 with the addition that said catalytic material is located in a band extending along the combustion-chamber wall transversely to the direction of air-movement thereover, the circumferential extent of said band being less than that of the film formed by said fuel-injecting means.

References Cited in the file of this patent

UNITED STATES PATENTS

| 2,803,229 | Schwaiger | Aug. 20, 1957 |
| 2,808,036 | Von Seggern et al. | Oct. 1, 1957 |

FOREIGN PATENTS

| 404,030 | Great Britain | Jan. 8, 1914 |
| 1,067,634 | France | Jan. 27, 1954 |